(12) United States Patent
Braun (10) Patent No.: US 7,646,993 B2
(45) Date of Patent: Jan. 12, 2010

(54) METHOD AND CONTROL DEVICE FOR DISPLAYING DIAGNOSIS DATA OF A PRINTER OR COPIER

(75) Inventor: Peter Braun, Mühldorf (DE)

(73) Assignee: Oce Printing Systems GmbH, Poing (DE)

( * ) Notice: Subject to any disclaimer, the term of this patent is extended or adjusted under 35 U.S.C. 154(b) by 274 days.

(21) Appl. No.: 10/583,656

(22) PCT Filed: Dec. 23, 2004

(86) PCT No.: PCT/EP2004/014693

§ 371 (c)(1),
(2), (4) Date: May 31, 2007

(87) PCT Pub. No.: WO2005/064470

PCT Pub. Date: Jul. 14, 2005

(65) Prior Publication Data

US 2007/0277057 A1 Nov. 29, 2007

(30) Foreign Application Priority Data

Dec. 23, 2003 (DE) .............................. 103 60 978

(51) Int. Cl.
G03G 15/00 (2006.01)
(52) U.S. Cl. .................. 399/9; 399/8; 399/10
(58) Field of Classification Search .............. 399/8, 399/9, 10, 11; 714/44
See application file for complete search history.

(56) References Cited

U.S. PATENT DOCUMENTS 4,167,322 A * 9/1979 Yano et al. ............ 399/11 X (Continued)

FOREIGN PATENT DOCUMENTS

DE 202 20 490 U1 10/2003

(Continued)

Primary Examiner—Sandra L Brase
(74) Attorney, Agent, or Firm—Schiff Hardin LLP (57) ABSTRACT

In a method for outputting data of a diagnosis data stream of a printer or copier, the diagnosis data stream comprises first data of a first data type and at least second data of the second data type, the first data and the second data each including structure date and use data corresponding to the respective data type. The diagnosis data stream is supplied to an evaluation program of an evaluation unit for evaluating the first and the second data. The structured data of the first data is analyzed with aid of the evaluation program, a first identification which is characteristic of the first data type being determined. Upon the determination of the first identification, selecting a first evaluation instruction from a plurality of evaluation instructions with aid of the evaluation program and loading it, the use data of the first data being evaluated with aid of the first evaluation instruction. With aid of the evaluation program it is verified whether the evaluated first data include further data areas comprising the second data which can be evaluated with aid of a further second evaluation instruction which can be selected from the plurality of evaluation instructions. The second data is analyzed with aid of the evaluation program, a second identification which is characteristic of the second data type being determined. Upon the determination of the second identification, the second evaluation instruction is selected from said plurality of evaluation instructions with aid of the evaluation program and loading it. The second data is evaluated and output with aid of the second evaluation instruction.

25 Claims, 7 Drawing Sheets

U.S. PATENT DOCUMENTS

| | | | |
|---|---|---|---|
| 5,243,382 A | | 9/1993 | Takano et al. |
| 5,343,276 A | * | 8/1994 | Yamashita et al. ............. 399/8 |
| 5,412,452 A | | 5/1995 | Rego et al. |
| 5,448,722 A | | 9/1995 | Lynne et al. |
| 5,715,496 A | * | 2/1998 | Sawada et al. ................. 399/8 |
| 5,848,264 A | | 12/1998 | Baird et al. |
| 5,903,730 A | | 5/1999 | Asai et al. |
| 6,016,204 A | * | 1/2000 | Budnik et al. ............... 399/9 X |
| 6,032,001 A | * | 2/2000 | Miyawaki ..................... 399/8 |
| 6,385,609 B1 | | 5/2002 | Barshefsky et al. |
| 6,427,053 B1 | * | 7/2002 | Eck et al. ..................... 399/10 |
| 6,650,949 B1 | | 11/2003 | Fera et al. |
| 6,842,588 B2 | * | 1/2005 | Haines .......................... 399/8 |
| 2003/0110413 A1 | | 6/2003 | Bernklau-Halvor |
| 2004/0098400 A1 | | 5/2004 | Landau et al. |

FOREIGN PATENT DOCUMENTS

| | | |
|---|---|---|
| EP | 0 927 933 A2 | 7/1999 |
| EP | 1 117 045 A2 | 7/2001 |
| EP | 1 338 928 A1 | 8/2003 |
| WO | WO 01/55862 | 8/2001 |

* cited by examiner

| Description | Trace.data |
|---|---|
| IPDS Command Length | 0021 |
| Write Image Control | D63D |
| Flag CCID | 400001 |
| Target Pel Count 1368... | 0558 |
| Target Scan Count 1492... | 05D4 |
| Source Pel Count 1368... | 0558 |
| Source Scan Count 1492... | 05D4 |
| Uncompressed Input Image | 00 |
| One Bit per Pel | 00 |
| No Pel Magnification | 01 |
| No Scan Magnification | 01 |
| 0 Grad Inline | 0000 |
| 90 Grad Baseline | 2D00 |
| Absolute I - Absolute B | 00 |
| Xm Coordinate of Image... | 000000 |
| Reserved | 00 |

FIG. 7

METHOD AND CONTROL DEVICE FOR DISPLAYING DIAGNOSIS DATA OF A PRINTER OR COPIER

BACKGROUND

The preferred embodiment relates to a method and a control device for processing and displaying diagnosis data of a printer or copier, which data are also referred to as trace data. Such trace data are, in particular, operating state data which describe the current operating state of the printer or copier, as well as use data which are assigned to individual operating events, such as, for example, print data. A printer or copier, in particular a high-performance printer or copier having a printing speed of ≧100 pages A4 per minute includes a number of assemblies having separate control units. These control units are, for example, microprocessor-controlled or include a personal computer.

In known printers or copiers, the trace data are separately stored in each individual assembly and can be directly read out from the respective assembly by a service technician with the aid of a service computer which is directly connected to this assembly. If a critical operating state or an error occurs, then the trace data are individually read out from the respective assembly or assemblies by the service technician and are processed with the aid of a specific evaluation program for evaluating diagnosis data in the specific control unit. The processed diagnosis data are analyzed during processing and are displayed on a display in an appropriate preset form, as a result whereof in particular operating states of the assembly as well as use and control data are displayed in order to determine a cause of error and to be able to take countermeasures.

For reading out the trace data from an assembly after occurrence of a critical operating state or an error, it is necessary in the prior art that a service technician who has a good general technical knowledge analyzes the critical operating state or the error with the aid of the trace data at the printer's site or the copier's site. In known printers or copiers it is indeed possible to locally store the trace data on a data carrier, such as a floppy disk, and to evaluate the stored data at a later point in time, for example, in a service center of the manufacturer of the printer. However, an operator already needs considerable knowledge for selecting and storing the trace data of a specific assembly of the printer or copier, as a result whereof an operator cannot be expected to save the trace data of a specific assembly on a data carrier.

From U.S. Pat. No. 5,243,382 a control system for a printer or copier is known, in which a portable maintenance device can be connected to a maintenance interface of the printer or copier. By means of this connection first data comprising status information are transmitted from the printer to the maintenance device. In addition, second data comprising status information can be input into the maintenance device. At least one piece of stored guide information on the basis of the first and second data can be displayed with the aid of the maintenance device. The stored data can further be transferred to a data processing system.

The assemblies of the printer or copier are also referred to as a component, each control unit of the component including hardware, firmware and software. In their entirety, the components of the printer or copier form a common technical process. In the case of critical operating states or error states of one component, these are to be analyzed with the aid of internal operating states, control data and use data processed by the component in order to determine the cause of error.

From the document U.S. Pat. No. 5,412,452, a system is known in which one diagnosis system control executes one diagnosis routine assigned to a diagnosis client with the aid of the respective diagnosis client.

From the document U.S. Pat. No. 5,243,382, a device is known which can be connected to a printer or copier in order to read out error data from the printer or copier.

From the document EP 0 927 933 A2, a remote monitoring system is known which monitors several devices with the aid of satellites.

From the document DE 292 20 490 U1, a printer or copier is known which has a data communication interface via which the data of the printer or copier can be read out and can be written. The reading out and the transfer of these data preferably takes place via a computer network.

From the document EP 1 338 928 A1, a method and a device for providing log data of a modularly constructed apparatus such as an electrophotographic image generating machine are known. The individual modules of the apparatus each have a fault storage, the respective content of which is transferred to a central control which evaluates the faults.

From the document WO 01/55862 A1, an arrangement and a method are known, in which with the aid of a parser module media data streams are divided into different product format types in order to transfer the correct commands to an analysis module. Further, log packets are transferred to a parser module which have so-called generator IDs. The parser module can identify with the aid of these IDs which program has sent the current packet.

From the document U.S. Pat. No. 5,448,722, a method and an arrangement for the diagnosis of system components are known, in which components and subcomponents are hierarchically organized, various diagnosis modules being provided which access data for analysis, which data are stored in a so-called black board data storage area. Several diagnosis modules which perform different analysis functions are provided. An analysis of a group of components within the selected hierarchical level is performed, in which the data stored in the black board data storage area are used. So-called log files can likewise be analyzed.

Other known high-performance printing or copying systems comprise several technical processes which are executed on various hardware platforms. Thus, print data are generated by a host computer and transferred to the printer or copier. The printer or copier includes several main control units, such as a controller and a device electronics. The main control units at least comprise control subunits which each form a component of a technical process. The controller has, for example, an input and output module, a raster module as well as an interface module. The device electronic has a main module, several submodules as well as satellite modules.

Upon occurrence of critical operating states or errors of the printer, operating states and current data of the individual components of a technical process are required for determining the cause of error. The operating states and the current data are generally referred to as trace data. A time-wise assignment of trace data of several components is not possible or only possible with considerable difficulty in the prior art since the trace data of individual components are analyzed and displayed with different program modules. In general, the processors, the operating states and the time bases of the individual components are different from one another. A cross-component analysis of the cause of error is thus very difficult.

SUMMARY

An object is to provide a method and a control device for displaying diagnosis data of a printer or copier, in which even diagnosis data of several control units can easily be displayed and analyzed.

In a method for outputting data of a diagnosis data stream of a printer or copier, the diagnosis data stream comprises first data of a first data type and at least second data of a second data type, the first data and the second data each including structure date and use data corresponding to the respective data type. The diagnosis data stream is supplied to an evaluation program of an evaluation unit for evaluating the first and the second data. The structured data of the first data is analyzed with aid of the evaluation program, a first identification which is characteristic of the first data type being determined. Upon the determination of the first identification, a first evaluation instruction is selected from a plurality of evaluation instructions with aid of the evaluation program and it is loaded, the use data of the first data being evaluated with aid of the first evaluation instruction. With aid of the evaluation program it is verified whether the evaluated first data include further data areas comprising the second data which can be evaluated with aid of a further second evaluation instruction which can be selected from the plurality of evaluation instructions. The second data is analyzed with aid of the evaluation program, a second identification which is characteristic of the second data type being determined. Upon the determination of the second identification, the second evaluation instruction is selected from the plurality of evaluation instructions with aid of the evaluation program and it is loaded. The second data is evaluated and output with aid of the second evaluation instruction.

BRIEF DESCRIPTION OF THE DRAWINGS

FIG. 6 is a screen shot printout for displaying analysis data of the trace data stream.

DESCRIPTION OF THE PREFERRED EMBODIMENT

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

What is achieved by means of this method according to the invention is that the data included in the diagnosis data stream are each processed with an appropriate evaluation instruction. In particular, by means of a module-like handling of the individual evaluation instructions, a simple adaptation and a simple handling of the evaluation and of the analysis are possible. After the analysis of the diagnosis data stream, the first and/or second evaluation instruction is preferably further processed with the aid of a further evaluation instruction.

Given a change in the trace data structure of a control unit, therefore only the one evaluation instruction for evaluating the trace data of this component itself has to be adapted. The evaluation program and the display program for displaying the analyzed trace data can be maintained unchanged. Further, several evaluation instructions can likewise be provided for processing the trace data of a control unit, the trace data then being analyzed and processed with the aid of the first evaluation instruction. When processing the trace data with the aid of the first evaluation instruction, a third evaluation instruction indicated in the first evaluation instruction is reloaded, with which at least part of the processed trace data is then further processed and further analyzed.

A second aspect of the preferred embodiment relates to a device for outputting data of a diagnosis data stream of a printer or copier, said device having an evaluation unit which processes a diagnosis data stream comprising first data of a first data type and comprising at least second data of a second data type, the first data and the second data each including structure data and use data corresponding to the respective data type. The evaluation unit executes an evaluation program for evaluating and outputting the first and the second data supplied with the aid of the diagnosis data stream. The evaluation unit analyzes the structure data of the first data and of the second data with the aid of the evaluation program, the evaluation unit determining a first identification which is characteristic of the first data type and a second identification which is characteristic of the second data type. Further, when determining the first identification, the evaluation unit selects a first evaluation instruction from a plurality of evaluation instructions with the aid of the evaluation program and loads this instruction, the evaluation unit evaluating and outputting the use data of the first data with the aid of this loaded evaluation instruction. Further, when determining the second identification, the evaluation unit selects a second evaluation instruction from a plurality of evaluation instructions with the aid of the evaluation program and loads this evaluation instruction, the evaluation unit evaluating and outputting the use data of the second data with the aid of the selected evaluation instruction.

By means of such a device of the preferred embodiment a simple handling of different data included in a diagnosis data stream is possible in a simple manner. In particular, a simple handling of the evaluation instructions is possible.

A third aspect of the preferred embodiment relates to a method for generating diagnosis data, in which with the aid of a first control unit first diagnosis data on the occurrence of preset first diagnosis events are stored event-wise in a first diagnosis data stream. Further, a time information of the point in time of the occurrence of one of these diagnosis events is generated, stored in the first diagnosis data stream and assigned to the diagnosis data of the respective diagnosis event. With the aid of at least a second control unit, second diagnosis data on the occurrence of preset second diagnosis events are stored event-wise in a second diagnosis data stream. Each time, a time information of the point in time of the occurrence of one of these second diagnosis events is generated, stored in the second diagnosis data stream and assigned to the diagnosis data of the respective diagnosis event. At least the first and second diagnosis data stored in the first diagnosis data stream and in the second diagnosis data stream are evaluated with the aid of an evaluation program, the diagnosis data of at least selected diagnosis events being output event-wise in the chronological order of their occurrence.

By means of such a method of the preferred embodiment, data of different diagnosis data streams can be output in a time-synchronized manner. Thus, a clear representation of the occurrence of individual events is possible, as a result whereof interactions between various events can be detected more easily and rapidly. The expense in time for finding errors and error causes can be considerably reduced by means of this method of the preferred embodiment.

A fourth aspect of the preferred embodiment relates to a device for generating diagnosis data. The device has a first control unit which stores first diagnosis data comprising information on the occurrence of preset first diagnosis events event-wise in a first diagnosis data stream and which, each time, generates a time information of the point in time of the occurrence of one of the first diagnosis events, stores it in the first diagnosis data stream and assigns the same to the diagnosis data of the respective diagnosis event. At least a second control unit stores at least second diagnosis data comprising information on the occurrence of preset second diagnosis events event-wise in a second diagnosis data stream. The control unit generates each time a time information of the point in time of the occurrence of one of these second diagnosis events, stores this time information in the second diagnosis data stream and assigns this time information to the diagnosis data of the respective diagnosis event. The device further comprises an evaluation unit which evaluates the first and second diagnosis data stored in the first diagnosis data stream and at least in the second diagnosis data stream, the evaluation unit outputting the diagnosis data at least of selected diagnosis events event-wise in the chronological order of their occurrence.

By means of such a device of the preferred embodiment the diagnosis data included in two different diagnosis data streams can be output jointly in the chronological order of their occurrence, as a result whereof a simple and clear representation of the information on occurred diagnosis events, which information is included in the first diagnosis data stream and in the second diagnosis data stream, can be clearly displayed. Causes of errors can thus be quickly detected, as a result whereof downtimes can be avoided.

What is achieved by means of the device and the method of the preferred embodiment is that the trace data of several control units of the printer or copier can easily be transferred from the printer or copier to a data processing unit and can be evaluated thereat. Further, the assignment of the first evaluation instruction to the first diagnosis data and of the second evaluation instruction to the second diagnosis data makes a simple handling of the evaluation instructions possible.

Figure 1:
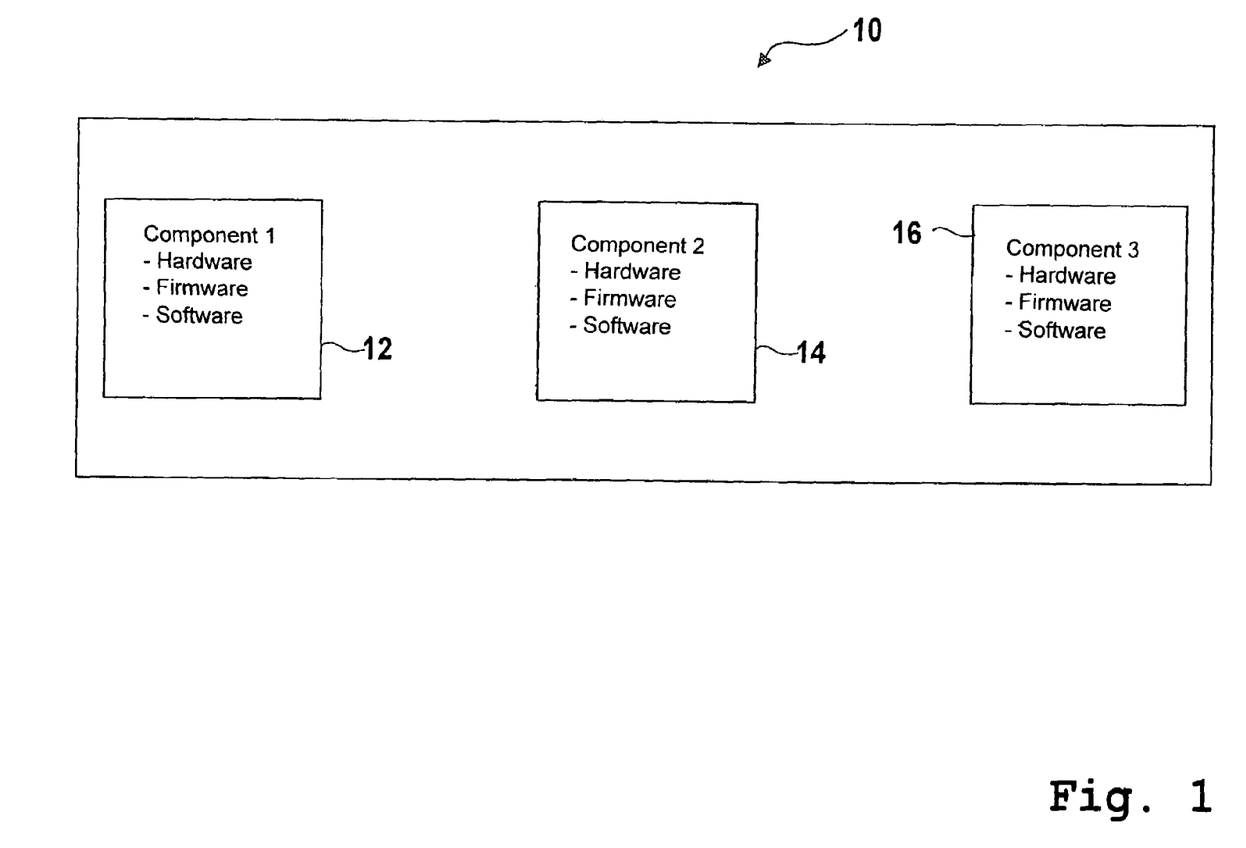
FIG. 1 is a schematic block diagram of a technical process in a printer.

In FIG. 1, a technical process 10 of a printer is illustrated, which comprises three components 12, 14, 16. Each of the components 12, 14, 16 includes hardware elements, a firmware as well as program elements for providing control functions and for processing data, in particular use data. The trace data generated by the respective component have a different data structure, in particular as a result of different data processing units, for example different microprocessor-controlled control units or personal computers of the individual components. The trace data preferably include information on operating states and on control and use data of the respective component which are to be processed. Due to the different data structure, the trace data cannot just be analyzed and evaluated as a whole. This problem occurs in particular in the case of high-performance printers in which several components of different manufacturers are included in one printer.

A joint evaluation of the trace data of several components is then not possible in the prior art. The evaluation of the trace data is thus carried out separately for each component in the prior art. For each trace data type, i.e. for trace data having a predetermined data structure, a separate program module is started and executed in the prior art, which module reads, analyzes and appropriately displays the trace data of one trace data type.

A cross-analysis of trace data of several components is only visually possible by a development engineer. Such a visual analysis is often too much for normal service technicians, in particular due to the large number of high-performance printers which are to be maintained. The cross-connection of trace data of several components can thus only be recognized by specialists. Further, no uniform time basis of the trace data is given, which allows for an exact information on the sequence of trace data of several components. The reading out of the trace data of individual components of the printer, too, often requires different operations, as a result whereof it is often too complicated for an operator to download the trace data of a specific component and to store them on a data carrier in order to then send them to the manufacturer of the printer for analysis.

Figure 2:
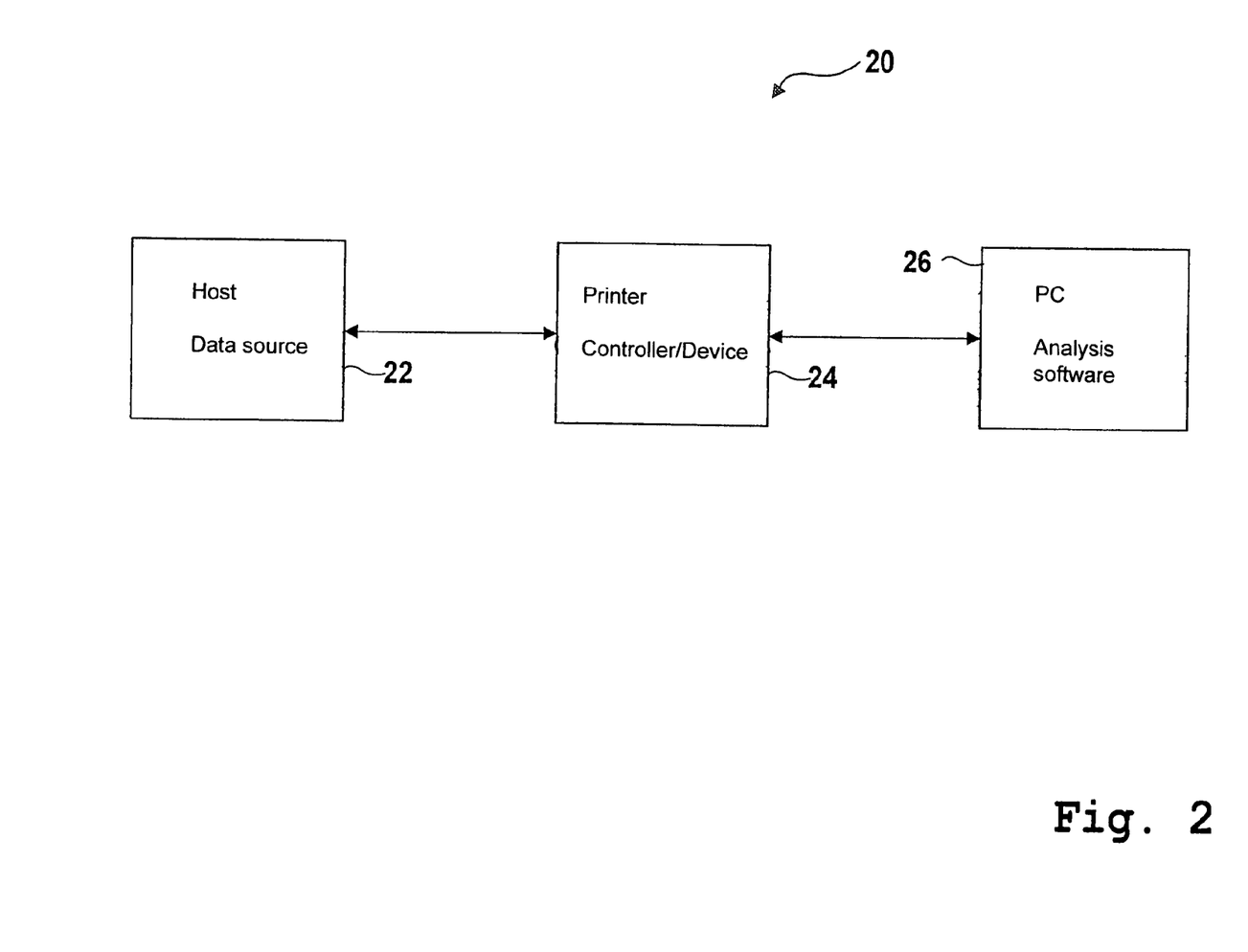
FIG. 2 is a block diagram of a printing system having maintenance computers connected thereto.

In FIG. 2, a print system 20 is shown, in which a host computer 22 transfers print data to the printer 24. The printer 24 comprises both a first control unit, the so-called controller, and a second control unit, the so-called device electronics. Further, the printer 24 transfers status data on individual print jobs transferred by the host computer 22 to the host computer 22. For the analysis of trace data, a personal computer 26, a so-called maintenance computer, is temporarily connected to the printer 24. With the aid of the personal computer 26, an analysis software is executed which serves to process the trace data transferred by the printer 24.

Figure 3:
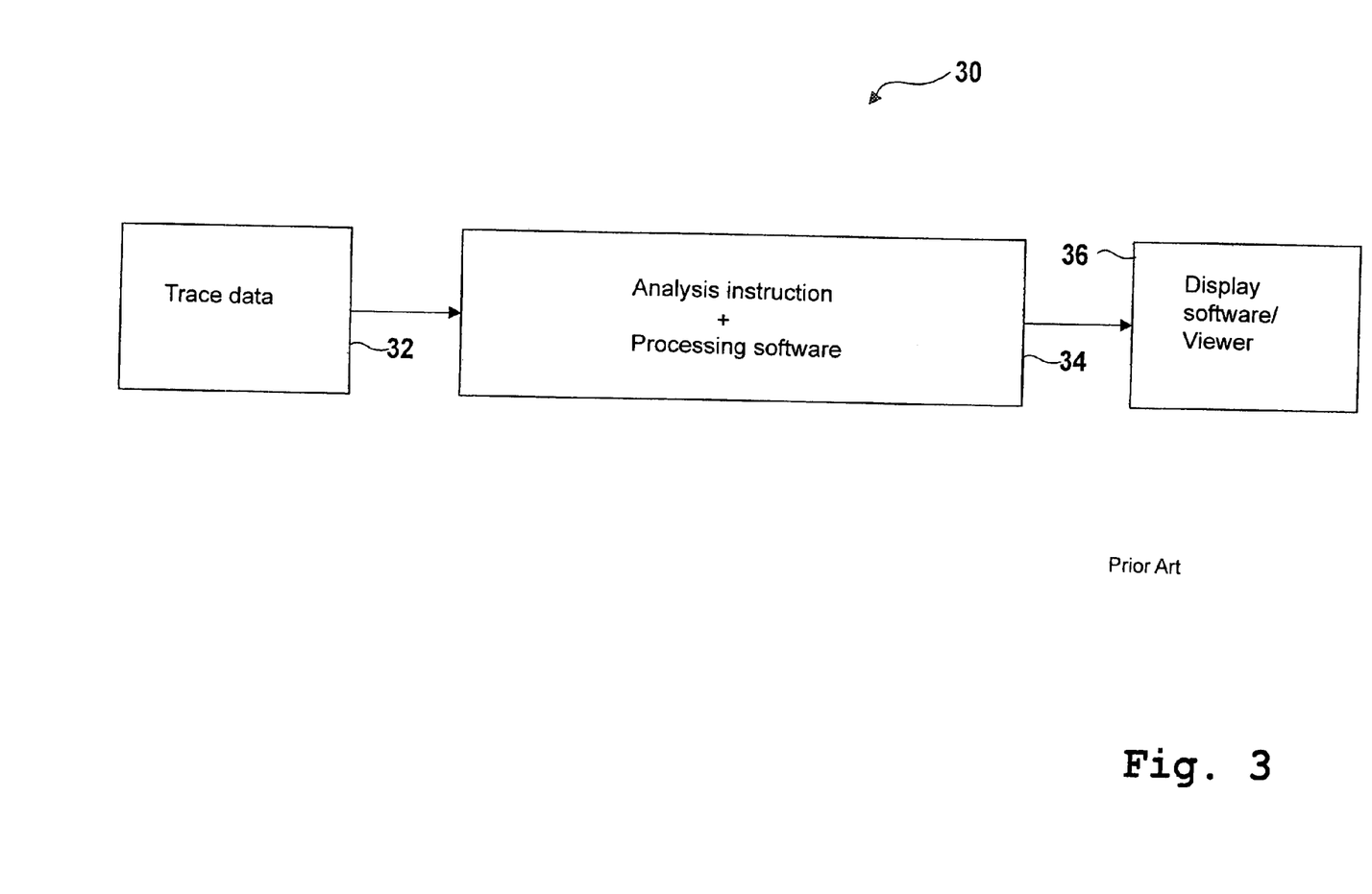
FIG. 3 is a block diagram for processing and displaying trace data according to the prior art.

In FIG. 3, a block circuit diagram of a system 30 for processing trace data 32 with the aid of the personal computer 26 of FIG. 2 according to the prior art is shown. As already explained in connection with FIG. 2, trace data 32 are transferred from the printer 24 to the personal computer 26. In the personal computer 26, the trace data 32 are supplied to a processing software 34 for processing and analyzing the trace data 32. The processing software also includes an analysis instruction for analyzing and processing the trace data 32 supplied. The trace data processed with the aid of the processing software are supplied to a display program module after processing, which module displays the processed trace data with the aid of a user interface.

If trace data having a different data structure, i.e. of different components or control units of the printer are to be analyzed and processed with the aid of the system 30, then, in the prior art, the personal computer 26 first has to be connected to an interface of the first control unit of the printer 24, first trace data being read out. The first trace data which are read out are processed and analyzed with the processing program module 34 and the processed data are displayed with the aid of the display software 36, as already described, on a display unit of the personal computer 26. Subsequently, in the prior art the personal computer 26 is connected to an interface of the second control unit of the printer 24, second trace data having been read out of this control unit. Subsequently, a second processing program module 34 which is different from the first processing program module has been loaded with which the second trace data have been processed and analyzed. The processed data have been supplied to a second display program.

Figure 4:
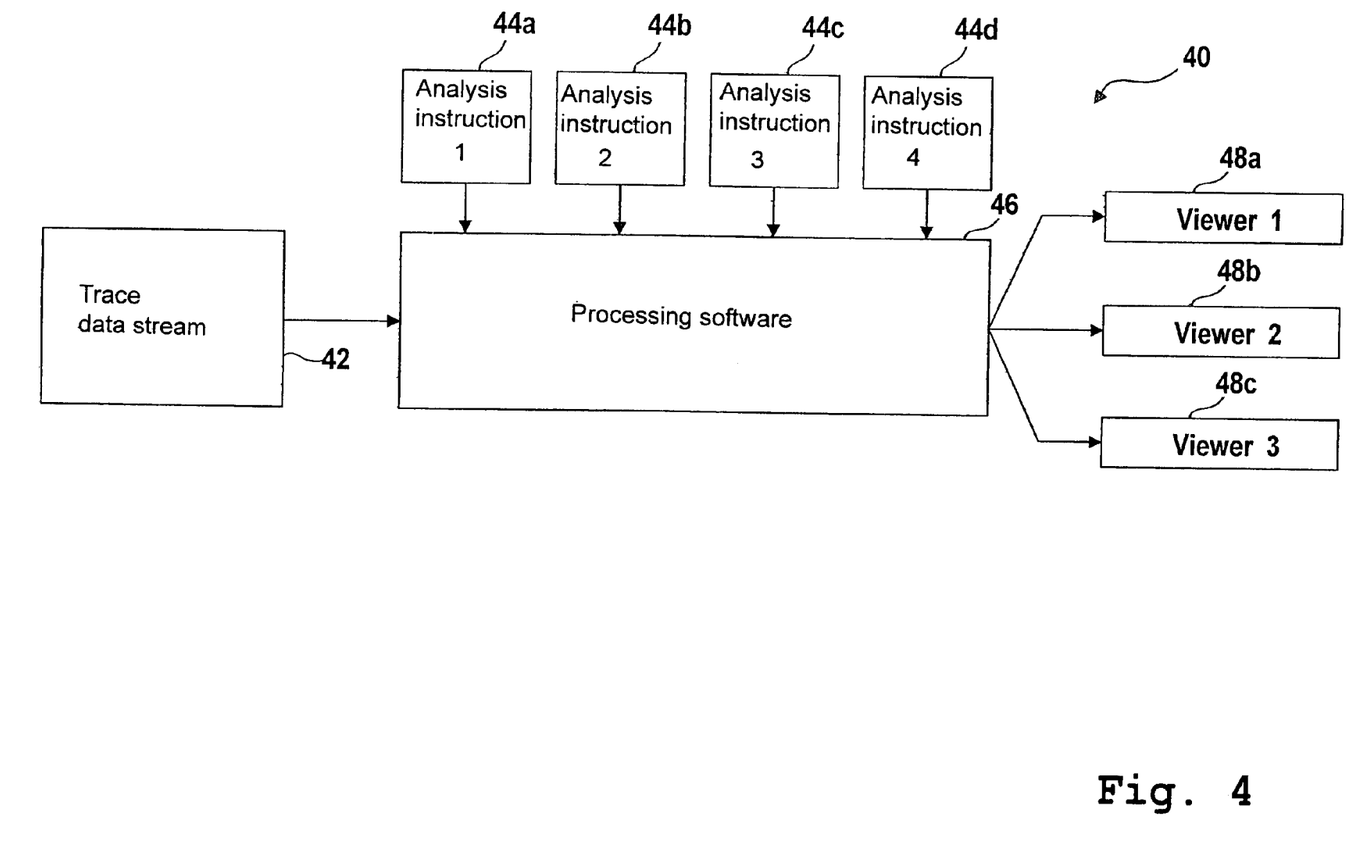
FIG. 4 is a block diagram for the processing and displaying of trace data of a trace data stream of the preferred embodiment.

In FIG. 4, a system 40 for the processing and analyzing of a trace data stream 42 of the preferred embodiment is illustrated. The trace data of the individual control units are combined to a trace data stream in the printer or copier, which data stream is stored in a data file. This data file including the trace data of several control units is then transferred to the maintenance computer 26 for analysis and display. In the maintenance computer the processing software 46, the analysis instructions 44a to 44d as well as the display program modules 48a to 48c are contained. Due to the ending of the transferred data file containing the trace data stream, the processing software 46 selects the analysis instruction 44a which searches the trace data stream for preset data sequences, so-called keys. In accordance with the analysis instruction 44a, the length of the data assigned to this key, i.e. the storage area in which these data are stored, is provided in a fixed preset distance to the key. This length is read out by the processing program 46, one of the other analysis instructions 44b, 44c, 44d being selected dependent on the actual determined key in order to further process the data assigned to the respective key.

A first key is assigned to the trace data generated by the first control unit and a second key is assigned to the second trace data generated by the second control unit. If the processing software 46 determines the first key in the trace data stream, then the associated data defined by the indicated length are further processed with the aid of the analysis instruction 44b assigned to the first key. The trace data identified with the aid of the second key, which are generated by the second control unit and defined by the indicated length assigned to the second key, are further processed with the aid of the analysis instruction 44c which is assigned to the second key. Subsequently, the second trace data are searched for a further third key with the aid of the processing software, the data identified by this third key then being further processed and analyzed with the analysis instruction 44d when this key is found. The trace data preferably include a so-called structure area which includes the key and the length field, and a so-called data area, the data of which are further processed by the processing software 46 dependent on the key.

The trace data processed with the aid of the processing software 46 can be combined in almost any way with the aid of the processing software so that an exact time sequence of operating states and error states is possible and can easily be displayed. The trace data processed are then displayed with the aid of the display program modules 48a, 48b and 48c which display the processed data, in particular in different data formats, for example as binary data, hexadecimal data, image data etc. on a display unit of the personal computer 26. Preferably, the data are displayed on a graphical user interface, in which the data format can be easily selected by the user, for example the service technician.

Preferably, the individual analysis instructions 44a to 44d are stored in separate data files in a storage area, preferably on a hard disk of the personal computer 26. As a result, further analysis instructions 44a to 44d can very easily be integrated into the processing analysis and display system 40. The adaptation of the system 40 when further control units of the printer or copier are added or when the data structure of the trace data of individual control units is changed, is then very easily possible. The data structure of individual trace data is thus included in the analysis instructions 44a to 44d. If more than two control units which generate trace data are provided in the printer or copier, then alternatively, a trace data stream with trace data of selected control units can also be generated. Further, the operating events and use data to be recorded in the trace data of the individual control units can be individually preset for each control unit. As a result, a problem-oriented trace data stream can very easily be generated.

Within the trace data stream, unique trace type designations are assigned to the trace data of the individual control units included in the trace data stream, in particular with the aid of keys. The trace data are structured in the trace data stream into structure areas and data areas, the structure area including in particular information on the key and information on the length of the data area.

Further, it is advantageous to combine the trace data generated by the individual control units of the printer dynamically, i.e. continuously, as a result whereof a current trace data stream is always present in the printer and the trace data do not have to be combined in one trace data stream for error analysis. By way of dynamically combining the trace data of several control units, at least the order of the operating states included in the trace data can easily be determined. In addition, the trace data generated by the control units can include a time stamp generated by the control units, as well as additionally or alternatively receive a time stamp when adding the trace data to the trace data stream. Trace data which are older than one day can automatically be deleted from the trace data stream in one embodiment of the invention. In other embodiments, the time interval after which the trace data are to be deleted can be preset as a parameter in the printer or copier.

By means of the processing and analyzing of the trace data stream of the entire printer according to the preferred embodiment, the trace data of several control units can be easily combined in a problem-oriented manner. Owing to a common time basis, individual events included in the trace data can be connected time-wise, by, for example, outputting the operating events included in the trace data in the chronological order of their occurrence in particular in the form of a list. As a result, a very clear time sequence of operating events of several control units of the printer is possible. As already noted, the trace data are preferably at least divided into a data area and a structure area. The structure area particularly includes the data type of the data included in the data area and the type of data representation. Thus, in the structure area particularly the length of a data field, such as byte or word long, the data format, such as ASCII, EBCDI or HEX, and the type of data such as image, sound, video or statistic data, are included. Further, the structure area includes at least a length field, by means of which at least the size of the data area is determined. Further, both the structure area as well as the data area can include a so-called header, in which further information on the data stored in the data area and/or in the structure area are included.

The type of display of the data included in the data area is preferably determined by the preset display instruction 48a to 48c in the processing software 46 and/or in the analysis instruction 44a to 44d for this data object. The processing software 46 uses the method of the preferred embodiment already explained for displaying several trace data types. The analysis instructions 44a to 44d are stored in so-called structure define language data files (SDL-data files), which, as already explained, are used by the processing software 46 for processing the trace data stream 42. As already explained in connection with the analysis instructions 44a to 44, the analysis instructions can be cascaded and hierarchically structured, as a result whereof individual trace data are processed and analyzed with several analysis instructions 44a to 44d. In particular, analysis instructions 44a to 44d for processing and analyzing IPDS data, PEC data, for analyzing trace data of a control unit for controlling the single sheet transport, a control unit for controlling a paper web drive and trace data on the internal time behavior of the printer are provided.

Figure 5:
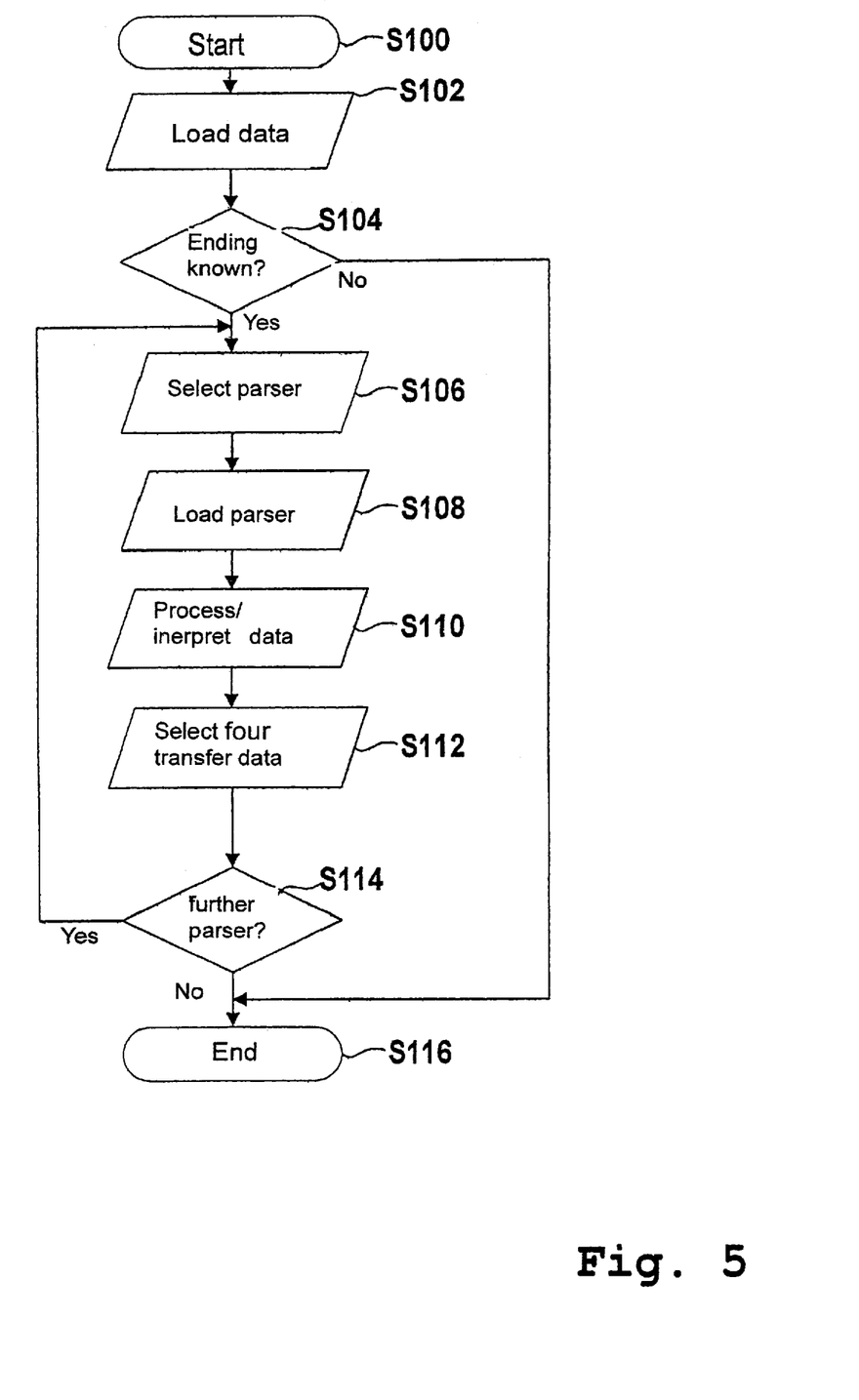
FIG. 5 is a flow chart for processing the trace data stream.

In FIG. 5, a sequence for processing and analyzing a trace data stream 42 with the aid of the system 40 is illustrated. In step S 100, the sequence is started. Subsequently, in step S 102 a data file comprising the trace data stream is loaded by the processing software 46. In this course and with the aid of the processing software 46, the data file extension is analyzed and it is verified whether an analysis instruction 44a for processing data files having this extension is present in the personal computer 26. If no analysis instruction 44a suitable for the data file extension of the loaded data file is present, the sequence is terminated in step S 116. If, however, in step S 104 it is determined that a suitable analysis instruction 44a is present, then this analysis instruction 44a is subsequently evaluated in step S 106. The analysis instruction is also referred to as a parser. In general, such a parser is a language analyzer which is part of a compiler. The parser is supplied with source data which the parser analyzes with respect to certain aspects and outputs data for further processing as a result of the analysis. With the aid of the parser, the supplied data are analyzed step by step, as already explained.

The parser selected in step S 106 is stored in a data file in a hard disk storage of the personal computer 26 and is loaded into a main memory of the personal computer 26 in step S 108 by the processing software 46. By loading the analysis instruction 44a into the main memory, the processing software 46 has access to the analysis instruction 44a stored in the data file. Subsequently, the processing software 46 processes, with the aid of the analysis instruction 44a, the supplied trace data stream and, in this course, interprets and analyzes the data included in the diagnosis data stream in step S 110. In doing so, the trace data are divided into trace objects with the aid of the parser. A trace object includes an offset which indicates the distance to the beginning of the data file, a length of the object, i.e. the number of the bytes of the trace object, the preferred display format and a description text for each display element. With the aid of the preferred display format, the selection of the representation takes place, conversion tables being selected by which the trace data are processed or converted. In particular, trace data in the HEX and EBCDII data format are converted into the ASCII data format in accordance with the respective conversion table. In addition, the order of the trace data can be changed. For example, the bytes of the data formats WORD and LONG can be turned around, i.e. the LOW bytes and the HIGH bytes are exchanged, as a result whereof the data sequence 0010 is converted into the data sequence 1000 in the Intel data format. Subsequently, in step S 112 a display program 48a is selected on the basis of the analyzed data in accordance with the display format information in the trace data for displaying the data processed in step S 110. Alternatively, the display program 48a is selected with the aid of the parser used when processing the trace data. Further, in step S 112 the processed data to be displayed are transferred to the display program 48a. Subsequently, it is verified in step S 114 whether the processed data include further data areas which are to be processed with the aid of a further analysis instruction 44b to 44d, i.e. are to be interpreted and analyzed. If this is the case, the steps S 106 to S 112 are executed again, the data of a further data area being further processed during the repeated execution of the steps S 106 to S 112. If this is not the case, then the sequence is subsequently terminated in step S 116.

In FIG. 6, a screen shot printout of a graphical user interface for displaying the trace data of a trace data stream is illustrated, which stream has been processed with the system 40 according to FIG. 4 as well as with the aid of the sequence according to FIG. 5. The analyzed trace data stream is stored on a hard disk drive D as data file CATMCS01.HII in the directory Trace/BMP_MC. As already described in connection with FIG. 5, the trace data stream included in the data file CATMCS01.HII has been analyzed with the aid of the first analysis instruction 44a. The analyzed data can be displayed with the aid of the non-activated register card 52 of the user interface 50. With the aid of the analysis instruction 44a, a data area with IPDS print data has been determined in the trace data stream. The IPDS print data have subsequently been analyzed and processed with the aid of the analysis instruction 44b by the processing software 46.

The interpreted and analyzed IPDS print data of the trace data stream are displayed in the display field 54 with the aid of the data areas included in the IPDS print data by activating the register card 53, which can be individually selected and activated with the aid of a selection bar 56. In the display field 58, the trace data included in the selected data area 56 are displayed in accordance with their trace data type. The trace data are indicated in the column Trace Data in a hexadecimal representation, information for explanation of the hexadecimal trace data being added to the trace data in a respective column Description. For individual data, such as the data element Target Pel Count, Target Scan Count, Source Pel Count, Source Scan Count, the hexadecimal trace data values are additionally given as decimal values. The description texts are preferably included in at least one of the analysis instructions 44a to 44c. The image data included in the trace data are displayed in the display field 60 with an adjustable zoom factor.

In other embodiments, a further analysis instruction for processing the image data themselves is required, as a result whereof a first parser for processing the IPDS print data and a second parser for processing the image data included in the IPDS print data are required. That is why the analysis instructions have to be executed in a cascaded manner and are interleaved with one another. The diagnosis data or, respectively, the trace data of the first and of the second control unit are arbitrarily arranged one after the other in the trace data stream, i.e. the trace data generated by the control unit on the basis of an operating event are added to the trace data stream, i.e. the trace data file, immediately after generation, as a result whereof an irregular succession of trace data of the first and second control unit is generated in the trace data stream over a longer period of time.

In the analysis instructions, i.e. in the parsers, it is further particularly indicated which processing steps are to be executed with which data types and which objects are to be processed by means of which preset methods. Preferably, a so-called user trace into which the trace data of all or of preset components or control units of the printer are continuously stored, is generated in the printer. The trace data at least in part also include use data which are necessary for analyzing and/or evaluating operating and error states. Such a trace data file can include a data amount of several megabytes up to some 10 gigabytes. From the German patent application having the official serial number 102 50 193.9, a method and a control device for analyzing operating data of a printer are known. The content of this patent application is herewith incorporated by reference into the present application.

Figure 7:
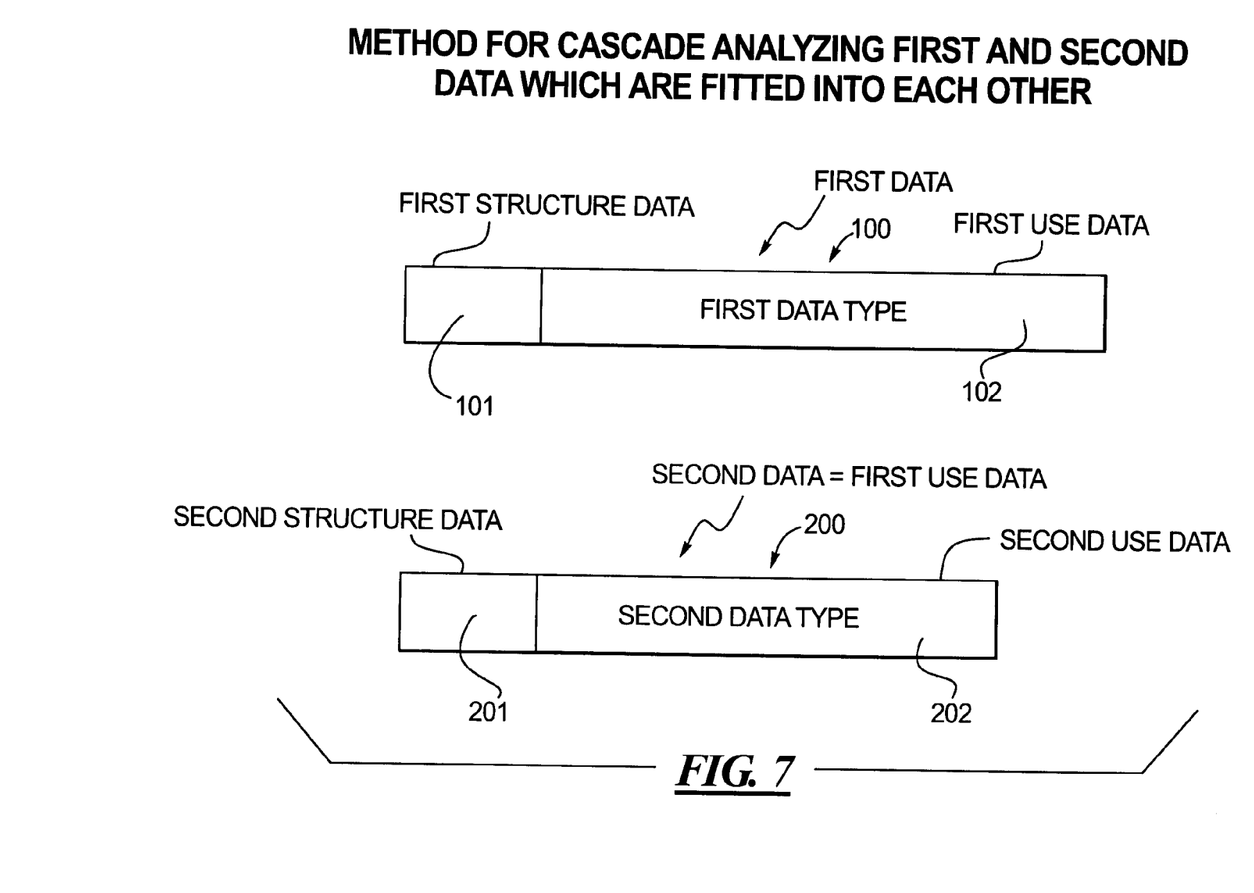
FIG. 7 shows a method for analyzing first and second data which are fitted into each other.

FIG. 7 shows the previously described first trace data 100 of the first data type and formed of the first structure data 101 and the first use data 102. FIG. 7 also shows the previously mentioned second trace data 200 of the second data type and formed of the second structured data 201 and the second use data 202.

Although in the drawings and in the preceding description preferred embodiments of the invention have been illustrated and described in every detail, these are to be considered as being merely exemplary and as not restricting the invention. It is pointed out that only the preferred embodiments have been illustrated and described and all variations and modifications which are within the scope of the invention at present or in the future are to be protected.

I claim as my invention:

1. A method for outputting data of a diagnosis data stream of a printer or copier, the diagnosis data stream comprising first data of a first data type and at least second data of a second data type, the first data and the second data each including structure data and use data corresponding to the respective data type, comprising the steps of:

supplying the diagnosis data stream to an evaluation program of an evaluation unit for evaluating the first and the second data;

analyzing the structure data of the first data with aid of the evaluation program, a first identification which is characteristic of the first data type being determined;

upon the determination of the first identification, selecting a first evaluation instruction from a plurality of evaluation instructions with aid of the evaluation program and loading it, the use data of the first data being evaluated with aid of the first evaluation instruction;

verifying with aid of the evaluation program whether the evaluated first data include further data areas comprising the second data which can be evaluated with aid of a further second evaluation instruction which can be selected from the plurality of evaluation instructions;

analyzing the second data with aid of the evaluation program, a second identification which is characteristic of the second data type being determined;

upon the determination of the second identification, selecting said second evaluation instruction from said plurality of evaluation instructions with aid of the evaluation program and loading it, the second data being evaluated and output with aid of the second evaluation instruction; and the first data being generated by a first control unit, the second data being generated by a second control unit, and the control units controlling several parallel processes.

2. A method according to claim 1 wherein with aid of the first evaluation instruction the use data of the first data are evaluated and output.

3. A method according to claim 1 wherein the first and/or second data each include encoded information.

4. A method according to claim 3 wherein each piece of encoded information is decoded with aid of the selected evaluation instruction.

5. A method according to claim 1 wherein the information content of one data element of the first and/or second data is determined with aid of the selected evaluation instruction by a position of the data element in a data sequence of the first or second diagnosis data.

6. A method according to claim 1 wherein the data type relates to an order of the information, an identification of the information, and/or a coding of the information.

7. A method according to claim 1 wherein the first and/or second data are binary data, numerical data, alphanumerical data and/or image data.

8. A method according to claim 1 wherein the first and/or second data include time information, error codes, measuring values, setting values, operating state information, status information, input parameters and/or output parameters.

9. A method according to claim 1 wherein the first data and the second data include similar information, which is included in the first and the second data in different order and/or with different coding.

10. A method according to claim 1 wherein the first data are different from the second data.

11. A method according to claim 1 wherein the first and/or the second data are sorted, converted and/or commented with aid of the respective evaluation instruction before they are displayed.

12. A method according to claim 1 wherein the first and/or second control unit is an input and/or output control unit, a print data processing unit, an interface control unit, an operating unit, a main control unit and/or a sub-module control unit.

13. A method according to claim 1 wherein at least a part of the first and/or the second data is generated upon occurrence of preset diagnosis events, when at least one of the control units determines one or several of the following events:

occurrence of errors;

occurrence of operating events;

processing of print data;

preset memory states; and/or amendment of software versions.

14. A method according to claim 1 wherein the first and/or the second data include print data and data comprising operating state information.

15. A method according to claim 1 wherein the diagnosis data stream is analyzed and interpreted with aid of a data processing unit and the processed first and/or the second data are displayed in a preset format.

16. A method according to claim 1 wherein the evaluation instructions are each stored in a separate data file, and with aid of an evaluation unit the first evaluation instruction for processing the first diagnosis data and the second evaluation instruction for processing the second diagnosis data are loaded into a main memory of said evaluation unit.

17. A method according to claim 1 wherein dependent on the selection of the evaluation instruction and/or information included in the evaluation instruction an appropriate display format is selected, with which processed diagnosis data are output with aid of an output unit.

18. A method according to claim 1 wherein the first and the second data both have a different data structure and/or a different data format.

19. A method for outputting data of a diagnosis data stream of a printer or copier, the diagnosis data stream comprising first data of a first data type and at least second data of a second data type, the first data and the second data each including structure data and use data corresponding to the respective data type, comprising the steps of:

supplying the diagnosis data stream to an evaluation program of an evaluation unit for evaluating the first and the second data;

analyzing the structure data of the first data with aid of the evaluation program, a first identification which is characteristic of the first data type being determined;

upon the determination of the first identification, selecting a first evaluation instruction from a plurality of evaluation instructions with aid of the evaluation program and loading it, the use data of the first data being evaluated with aid of the first evaluation instruction;

verifying with aid of the evaluation program whether the evaluated first data include further data areas comprising the second data which can be evaluated with aid of a further second evaluation instruction which can be selected from the plurality of evaluation instructions;

analyzing the second data with aid of the evaluation program, a second identification which is characteristic of the second data type being determined;

upon the determination of the second identification, selecting said second evaluation instruction from said plurality of evaluation instructions with aid of the evaluation program and loading it, the second data being evaluated and output with aid of the second evaluation instruction;

the diagnosis data stream being searched for preset data sequences with aid of the first evaluation instruction, and dependent on the determined data sequence, a second evaluation instruction being selected, the further data assigned to said preset data sequence in the diagnosis data stream being processed with aid of the second evaluation instruction; and the preset data sequence including key data, which indicate whether the data assigned to said key data are first data or second data.

20. A method for outputting data of a diagnosis data stream of a printer or copier, the diagnosis data stream comprising first data of a first data type and at least second data of a second data type, the first data and the second data each including structure data and use data corresponding to the respective data type, comprising the steps of:

supplying the diagnosis data stream to an evaluation program of an evaluation unit for evaluating the first and the second data;

analyzing the structure data of the first data with aid of the evaluation program, a first identification which is characteristic of the first data type being determined;

upon the determination of the first identification, selecting a first evaluation instruction from a plurality of evaluation instructions with aid of the evaluation program and loading it, the use data of the first data being evaluated with aid of the first evaluation instruction;

verifying with aid of the evaluation program whether the evaluated first data include further data areas comprising the second data which can be evaluated with aid of a further second evaluation instruction which can be selected from the plurality of evaluation instructions;

analyzing the second data with aid of the evaluation program, a second identification which is characteristic of the second data type being determined;

upon the determination of the second identification, selecting said second evaluation instruction from said plurality of evaluation instructions with aid of the evaluation program and loading it, the second data being evaluated and output with aid of the second evaluation instruction;

the diagnosis data stream being included in a data file, the data file being supplied to an evaluation unit; and a further evaluation instruction being selected and loaded by the data processing unit dependent on extension of a data file name, with aid of said further evaluation instruction the first data and the second data being determined in the diagnosis data stream and are then further processed with aid of the first and/or the second evaluation instruction.

21. A method for outputting data of a diagnosis data stream of a printer or copier, the diagnosis data stream comprising first data of a first data type and at least second data of a second data type, the first data and the second data each including structure data and use data corresponding to the respective data type, comprising the steps of:

supplying the diagnosis data stream to an evaluation program of an evaluation unit for evaluating the first and the second data;

analyzing the structure data of the first data with aid of the evaluation program, a first identification which is characteristic of the first data type being determined;

upon the determination of the first identification, selecting a first evaluation instruction from a plurality of evaluation instructions with aid of the evaluation program and loading it, the use data of the first data being evaluated with aid of the first evaluation instruction;

verifying with aid of the evaluation program whether the evaluated first data include further data areas comprising the second data which can be evaluated with aid of a further second evaluation instruction which can be selected from the plurality of evaluation instructions;

analyzing the second data with aid of the evaluation program, a second identification which is characteristic of the second data type being determined;

upon the determination of the second identification, selecting said second evaluation instruction from said plurality of evaluation instructions with aid of the evaluation program and loading it, the second data being evaluated and output with aid of the second evaluation instruction; and assignment of the first data included in the diagnosis data stream to the first evaluation instruction being made with aid of a unique first key included in the diagnosis data stream and of the second data included in the diagnosis data stream to the second evaluation instruction being made with aid of a unique second key included in the diagnosis data stream, and with aid of the keys the data assigned to the respective key being identified as the first data or as the second data and being recognized as the first data or as the second data with aid of these keys.

22. A method for outputting data of a diagnosis data stream of a printer or copier, the diagnosis data stream comprising first data of a first data type and at least second data of a second data type, the first data and the second data each including structure data and use data corresponding to the respective data type, comprising the steps of:

supplying the diagnosis data stream to an evaluation program of an evaluation unit for evaluating the first and the second data;

analyzing the structure data of the first data with aid of the evaluation program, a first identification which is characteristic of the first data type being determined;

upon the determination of the first identification, selecting a first evaluation instruction from a plurality of evaluation instructions with aid of the evaluation program and loading it, the use data of the first data being evaluated with aid of the first evaluation instruction;

verifying with aid of the evaluation program whether the evaluated first data include further data areas comprising the second data which can be evaluated with aid of a further second evaluation instruction which can be selected from the plurality of evaluation instructions;

analyzing the second data with aid of the evaluation program, a second identification which is characteristic of the second data type being determined;

upon the determination of the second identification, selecting said second evaluation instruction from said plurality of evaluation instructions with aid of the evaluation program and loading it, the second data being evaluated and output with aid of the second evaluation instruction; and the diagnosis data stream comprising the first data and the second data being generated with aid of a control unit, and with aid of said control unit a first key being assigned to the first diagnosis data and a second key being assigned to the second diagnosis data.

23. A method according to claim 22 wherein a data amount information is stored in a predetermined distance to the key as a length information which indicates a storage amount of the respective diagnosis data in the diagnosis data stream.

24. A device for outputting data of a diagnosis data stream on a printer or copier, comprising:

an evaluation unit which processes a diagnosis data stream comprising first data of a first data type and comprising at least second data of a second data type, the first data and the second data each including structure data and use data corresponding to the respective data type;

the evaluation unit executing an evaluation program for evaluating and outputting the first and the second data supplied with aid of the diagnosis data stream;

the evaluation unit analyzing the structure data of the first and the second data with aid of the evaluation program, the evaluation unit determining a first identification which is characteristic of the first data type;

the evaluation unit selecting and loading a first evaluation instruction from a plurality of evaluation instructions with aid of the evaluation program upon determination of the first identification, the evaluation unit evaluating the use data of the first data with aid of said loaded evaluation instruction;

the evaluation unit verifying with aid of the evaluation program whether the evaluated first data include further data areas comprising the second data which can be evaluated with aid of a further second evaluation instruction;

the evaluation unit analyzing the second data with aid of the evaluation program and determining a second identification which is characteristic of the second data type;

the evaluation unit selecting and loading a second evaluation instruction from the plurality of evaluation instructions with aid of the evaluation program upon determination of the second identification, the evaluation unit evaluating and outputting the use data of the second data with aid of the selected evaluation instruction; and the first control unit generating the first data, a second control unit generating the second data, and the control units controlling several parallel processes.

25. A device according to claim 24 wherein the evaluation unit evaluates and outputs the use data of the first data with aid of the loaded first evaluation instruction.

* * * * *